United States Patent
Kawamura et al.

(10) Patent No.: US 6,657,681 B1
(45) Date of Patent: Dec. 2, 2003

(54) LIQUID CRYSTAL PANEL

(75) Inventors: Katsuaki Kawamura, Saitama-ken (JP); Kensei Furuya, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 418 days.

(21) Appl. No.: 09/688,210

(22) Filed: Oct. 16, 2000

(30) Foreign Application Priority Data

Oct. 20, 1999 (JP) .......................................... 11-298046

(51) Int. Cl.$^7$ ................................................. G02L 1/13
(52) U.S. Cl. ........................................................ 349/34
(58) Field of Search ........................................... 349/34

(56) References Cited

U.S. PATENT DOCUMENTS

| | | | |
|---|---|---|---|
| 4,412,214 A | 10/1983 | Tanaka et al. | 340/765 |
| 5,881,299 A | 3/1999 | Nomura et al. | 395/750.06 |
| 5,897,186 A * | 4/1999 | Smid | 349/143 |

FOREIGN PATENT DOCUMENTS

GB    2 195 195 A    3/1988

OTHER PUBLICATIONS

Data Sheet, JP 11 281961, Oct. 15, 1999, abstract only.

* cited by examiner

*Primary Examiner*—James Dudek
(74) *Attorney, Agent, or Firm*—Arent Fox Kintner Plotkin & Kahn, PLLC

(57) ABSTRACT

A liquid crystal panel 1 comprises a plurality of liquid crystal display areas (picto-display area A and the dot-display area C) which are controlled and driven by different driving manners (different driving voltages), an electrode section B is disposed between the plurality of liquid crystal display areas, a driving voltage for driving the electrode section B is equal to at least one of the different driving voltages for driving the plurality of different liquid crystal display areas. Therefore, it is sure to prevent an undesired movement of ionic substances from one display area to another, thus preventing mutual interference between the plurality of liquid crystal display areas thereby preventing any of he display areas from becoming darkened or nicked, thus improving the display quality of the liquid crystal panel.

8 Claims, 5 Drawing Sheets

LIQUID CRYSTAL PANEL

BACKGROUND OF THE INVENTION

The present invention relates to a liquid crystal panel, in particular to a liquid crystal panel suitable for use as a liquid crystal display which is capable of simultaneously displaying a static picture and a dot picture on a transparent substrate board.

LCD (Liquid Crystal Device) is usually in a liquid state, but also exhibits a property as a solid crystal. Once an external voltage is applied to such an LCD, orientation of the crystal will change, hence causing a change in both its transparency and its color. When such a kind of liquid crystal device is used to form a display panel, the above-mentioned liquid crystal panel can thus be formed.

Usually, a liquid crystal panel is required to have a light source since the panel itself is not luminescent. In spite of this, a liquid crystal panel is still considered to be superior to a CRT (Cathode Ray Tube) because it is compact in size, light in weight and consumes less electricity. As a result, a liquid crystal panel has often been used as a display monitor in a mobile device such as a note-type personal computer, a PDA (Personal Digital Assistant), and a portable telephone.

However, the above-mentioned liquid crystal panel, especially, a liquid crystal panel for use as a display monitor in a PDA or a portable telephone, usually includes a transparent substrate board on which two different pictures are simultaneously displayed, with one in a static-dislay area (hereinafter, referred to as "picto-display area) and the other in a dot-display area (hereinafter, referred to as "dot-display area). In detail, the static-display area contains stationary icon(s), while the dot-display area contains changing message(s).

FIG. 5 is a cross sectional view showing a conventional liquid crystal panel. As shown in FIG. 5, the conventional liquid crystal panel has a liquid crystal layer 11 which is interposed between an upper side transparent glass substrate 18 and a lower side glass substrate 19, and is functionally divided into a picto-display area A and a dot-display area C. Each of the glass substrates 18 and 19 is provided on the inner side thereof with a transparent electrode layer consisting of ITO (Indium Tin Oxide). Specifically, the picto-display area A involves an upper ITO layer 12 and a lower ITO layer 13 which are faced each other, while the dot-display area C involves an upper ITO layer 14 and a lower ITO layer 15 which are also faced each other.

When an external voltage is applied between mutually faced ITO layers 12 and 13, and another external voltage is applied between mutually faced ITO layers 14 and 15, and when the external voltages are made variable so as to change light changing amounts, it is possible to display various desired data on the panel. In this way, when a liquid crystal panel contains the picto-display area A and a dot-display area C, voltages supplied from independently prepared driving sources can be used to effect desired display on the liquid crystal panel.

Usually, the dot-display area C has a larger capacity than that of the picto-display area A. In order to inhibit an electricity consumption on the dot-display area C, this display area is usually driven by a power-saving mold. Namely, if an external voltage of ten and several Volts is continuously applied between the ITO layers 14 and 15 to keep a desired display, and if there is no change in the display content during a predetermined time period, the ITO layers 14 and 15 can then be set at the same potential so as to make the area to be in a forced non-display state. At this time, a (driving) voltage difference will occur between the picto-display area A and the dot-display area C and such a (driving) voltage difference will cause ionic substances contained in the liquid crystal layer 11 to move therebetween, resulting in an undesired mutual interference between the picto-display area A and the dot-display area C.

Namely, if the dot-display area C is fixed at a higher voltage, the ionic substances contained in the liquid crystal layer 11 will be moved from the picto-display area A to the dot-display area C. Consequently, the concentration of the ionic substances in the dot-display area C will be increased, causing a change in the threshold value of the light changing amount in this area. As a result, the dot-display area C becomes darkened while the picto-display area A becomes nicked, making it difficult to obtain a satisfactory picture display.

SUMMARY OF THE INVENTION

It is an object of the present invention to provide an improved liquid crystal panel capable of preventing mutual interference between a plurality of display areas, so as to improve the display quality of the liquid crystal panel, thereby solving the above-mentioned problems peculiar to the above-discussed prior art.

According to the present invention, there is provided a liquid crystal panel comprising: a pair of light transmissible substrate plates; a plurality of liquid crystal display areas controlled and driven by different driving manners; and an electrode sect ion disposed between the plurality of liquid crystal display areas.

According to one aspect of the invention, said different driving manners are different driving voltages.

According to another aspect of the invention, the plurality of liquid crystal display areas include at least one static-display area and at least one dot-display area.

According to a further aspect of the invention, the plurality of liquid crystal display areas include at least one constantly displayed area, and at least one area capable of independently changing-over between a displayed state and a non-displayed state.

According to a still further aspect of the invention, the non-displayed state is a state controlled by a power-saving mode.

According to one more aspect of the invent ion, a driving voltage for driving the electrode section is equal to at least one of the different driving voltages for driving the plurality of different liquid crystal display areas.

According to still one more aspect of the invention, the driving voltage for driving the electrode section is selected in view of the property of a liquid crystal used in the liquid crystal panel.

The above objects and features of the present invention will become better understood from the following description with reference to the accompanying drawings.

DETAILED DESCRIPTION OF THE PREFERRED EMBODIMENTS

Figure 1:
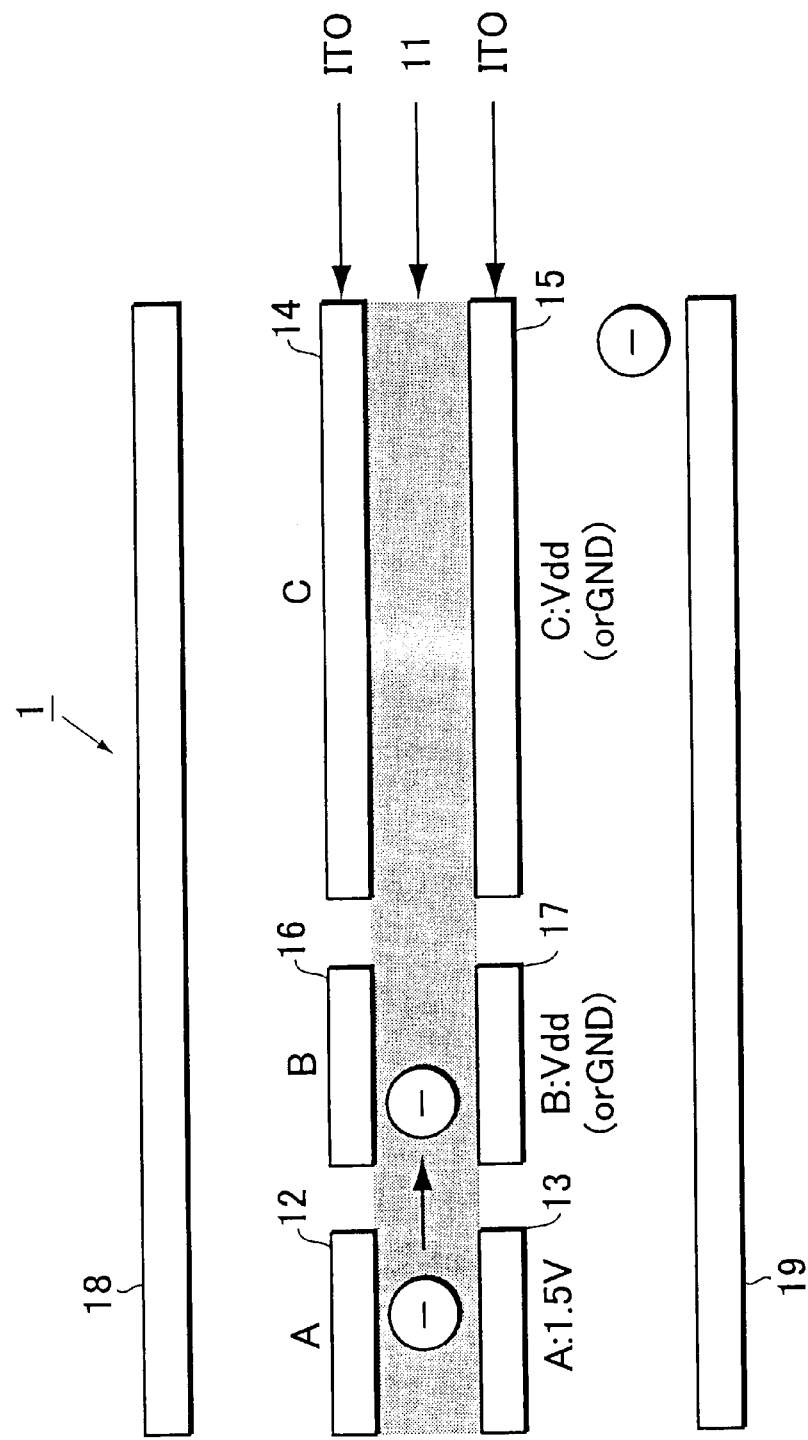
FIG. 1 is an explanatory cross sectional view showing a liquid crystal panel formed according to the present invention.
Figure 5:
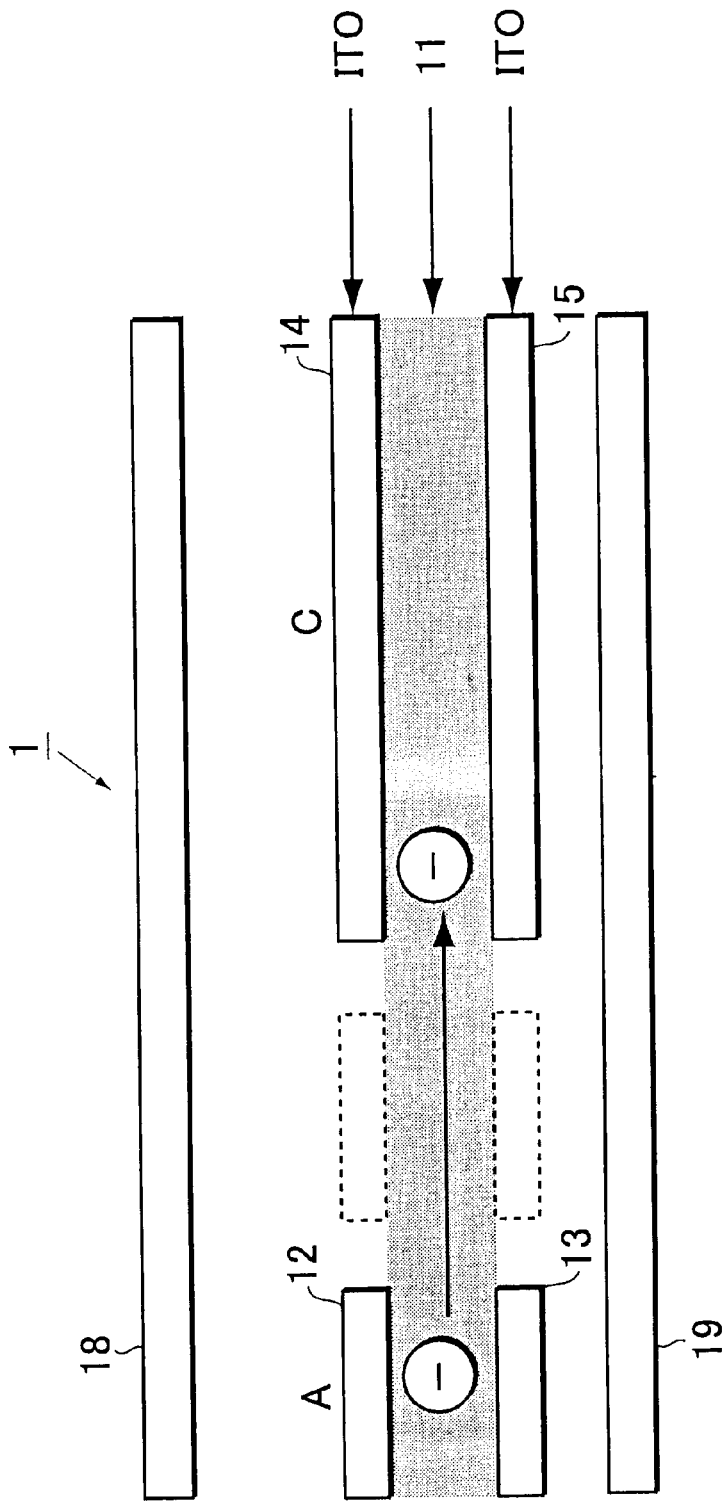
FIG. 5 is an explanatory cross sectional view showing a liquid crystal panel formed according to a prior art.

FIG. 1 is an explanatory cross sectional view showing a liquid crystal panel formed according to an embodiment of the present invention. The liquid crystal panel shown in FIG. 1 is different from the conventional liquid crystal panel (shown in FIG. 5) in that it has a guard electrode section B interposed between the picto-display area A and the dot-display area C.

As shown in FIG. 1, the picto-display area A and the dot-display area C are able to display pictures independently by virtue of the voltages applied between the ITO layers 12, 13 and the ITO layers 14, 15. At this time, the ionic substances contained in the liquid crystal layer I1 will not move from one display area to the other. Even if there is such a movement of ionic substances, the moved ionic substances will all be collected in the guard electrode section B which is not a display area, therefore preventing any possible troubles associated with the conventional liquid crystal panel shown in FIG. 5.

When the dot-display area C is driven by a power-saving mode and a voltage applied between the ITO layers 14 and 15 is higher than that applied between the ITO layers 12 and 13, the same voltage as that applied to the dot-display area C is applied between the ITO layers 16 and 17 which together form the guard electrode section B. In this way, it is sure to prevent the ionic substances contained in the liquid crystal layer 11 from moving to the dot-display area C, since the ionic substances are all stopped by the guard electrode section B. Therefore, it is possible to prevent a mutual interference between the picto-display area A and the dot-display area C, thus preventing the dot-display area C from becoming darkened and also preventing the picto-display area A from becoming nicked. Accordingly, although the ionic substances are collected around the guard electrode section B, since the same voltage as that applied to the dot-display area C is applied between the ITO layers 16 and 17 (together forming the guard electrode section B), the liquid crystal panel will not become darkened even if there is a change in the threshold value of the liquid crystal.

Figure 2:
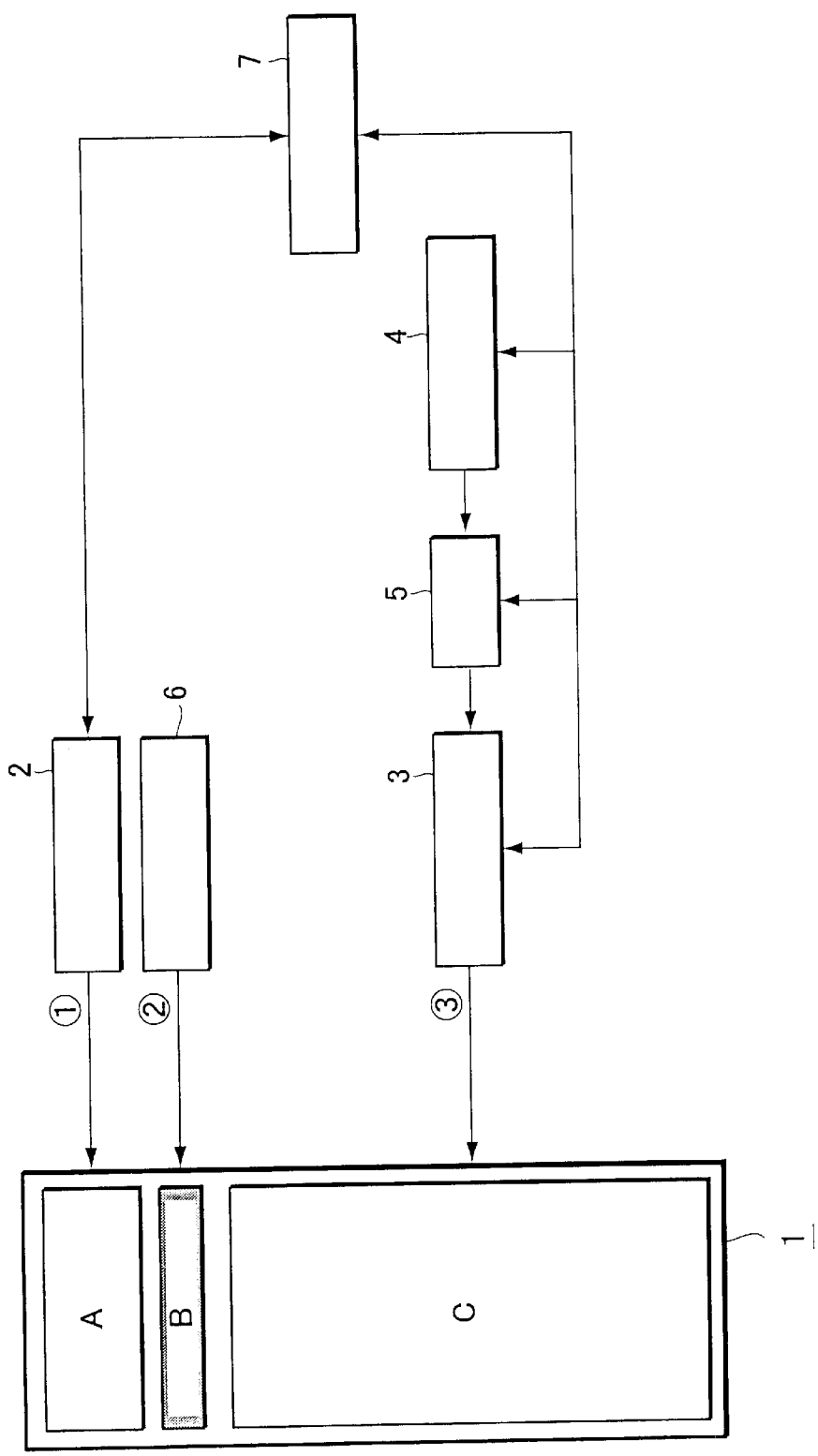
FIG. 2 is a block diagram showing the liquid crystal panel of the present invention including controlling and driving circuits.

FIG. 2 is a block diagram showing an arrangement including the liquid crystal panel shown in FIG. 1 and related driving circuits.

Referring to FIG. 2, a picto-display drive 2 is provided to drive the picto-display area A in accordance with a control signal fed from a controller 7. A liquid crystal drive 3 is provided to drive the dot-display area C also in accordance with a control signal fed from the controller 7. A DC-DC converter 4 is provided under the control of the controller 7 to produce a necessary voltage for driving the liquid crystal panel 1 and to supply the voltage to the buffer 5. Here, the buffer 5 is used to supply various voltages to the drive 3 for driving the dot-display area C. In this arrangement, when a power-saving signal is issued from the controller 7, the DC-DC converter 4 the buffer 5, and the liquid crystal drive 3 may be driven in a low electricity consuming mode. At this time, the output of the DC-DC converter 4 is made OFF, while the liquid crystal drive 3 is fixed at a potential Vdd. Here, the guard electrode drive 6 uses a driving voltage which is equal to a driving voltage used either by the picto-display drive 2 or by the liquid crystal drive 3, depending upon the characteristics of the liquid crystal layer 11.

Figure 3:
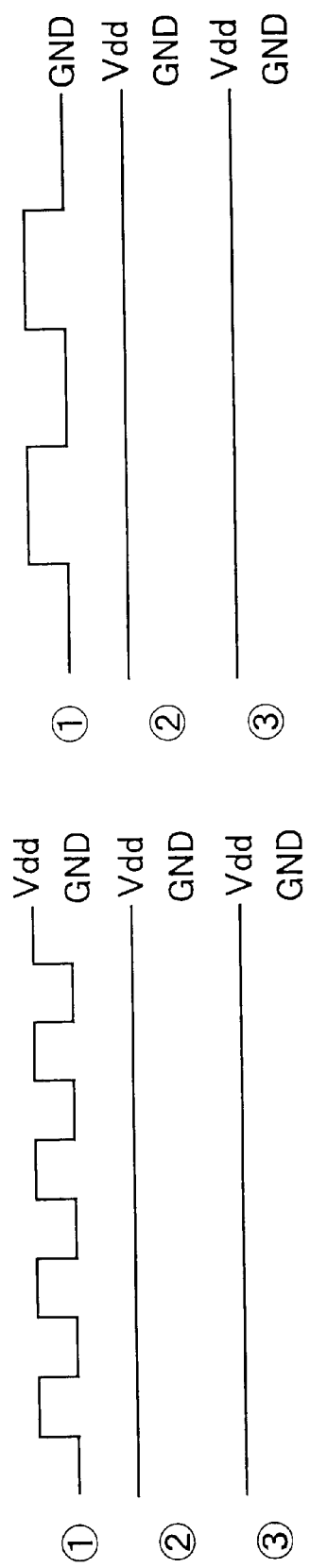
FIG. 3 is a timing chart, showing the waveforms of various voltages applied to the liquid crystal panel of the present invention.

FIG. 3 is a timing chart showing the driving operations of various driving circuits shown in FIG. 2. In FIG. 3, the waveforms shown on the left side represent voltages applied to the upper ITO layers, while the waveforms shown on the right side represent voltages applied to the lower ITO layers, representing the waveforms of driving voltages of the picto-display drive 2, the guard electrode drive 6 and the liquid crystal drive 3. In detail, ① represents the waveforms of the driving voltages of the picto-display drive 2, ② represents the waveforms of the driving voltages of the guard electrode drive 6, ③ represents the waveforms of the driving voltages of the liquid crystal drive 3.

In this manner, the Picto-display area A can display by virtue of a voltage applied between the upper and lower ITO layers 12 and 13. The upper ITO layer 12. is made ON and OFF repeatedly in a predetermined period, while the lower ITO layer 13 is also made ON and OFF repeatedly in a predetermined period which is ½ of the upper ITO layer 12, thereby maintaining an average voltage of 1.5 V. Similarly, the dot-display area C can display by virtue of a voltage applied between the upper and lower ITO layers 14 and 15. On the other hand, when the dot-display area C is driven by a power-saving mode so that it is in a non-display state, the upper and lower ITO layers 14 and 15 are placed at the same potential so that a voltage therebetween becomes zero. However, when the dot-display area C is in its display state, a driving voltage (Vdd) of 3.1 V is needed to be applied between the upper and lower ITO layers 14 and 15 in order to maintain a driving function.

In deed, the picto-display area A is driven by an average effective voltage 1.5 V so as to be maintained in a display state, while the dot-display area C is driven by a power-saving mode so as to stop its display and is fixed at a DC voltage of 3.1 V, resulting in a voltage difference between the picto-display area A and the dot-display area C and hence resulting a mutual interference between the two display areas. However, such a kind of mutual interference is eliminated by the guard electrode section B. Namely, when the dot-display area C is at a voltage Vdd, guard electrode section B is also set at a voltage which is equal to Vdd. When dot-display area C is at a voltage GND, guard electrode section B is also set at a voltage which is equal to GND. Here, the dot-display area C driven by the liquid crystal drive 3, when in its non-display state, receives a voltage supply which is either a voltage VDD or a voltage GND, depending upon the type of the liquid crystal drive 3. In the present embodiment, a voltage Vdd is applied to effect a non-display state.

Figure 4:
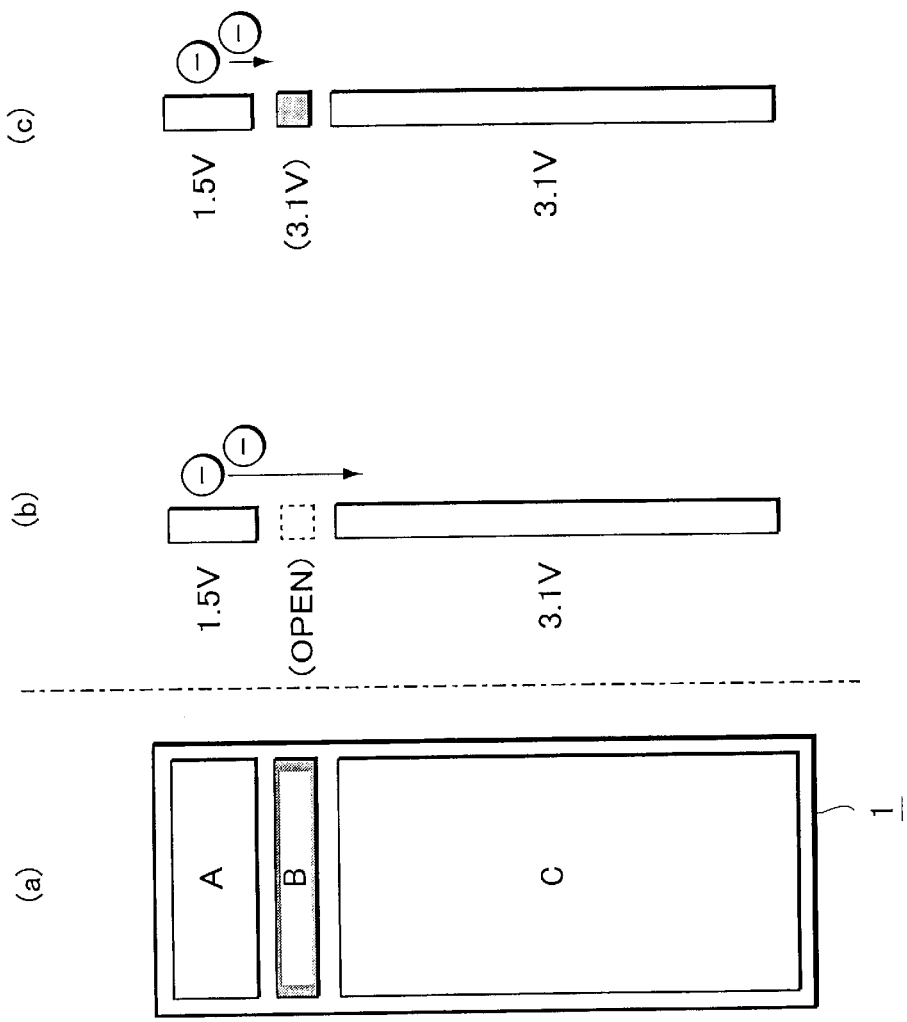
FIG. 4 is an explanatory view showing a comparison between the liquid crystal panel of the present invention and a conventional liquid crystal panel.

FIG. 4 is an explanatory view showing a difference between an example of the present invention and that of a prior art. In FIG. 4, the same elements as those shown in FIG. 1 are represented by the same reference numerals. In FIG. 4, (a) is a front view of the liquid crystal panel, (b) is a sectional view of the liquid crystal panel, showing the movement of the ionic substances during a power-saving mode, according a prior art, (c) is a sectional view of the liquid crystal panel, showing the movement of the ionic substances during a power-saving mode, according to the present invention.

Referring to FIG. 4, the present invention has been accomplished by providing the guard electrode section B between picto-display area A and the dot-display area C. Therefore, as shown in (c) of FIG. 3, when the picto-display area A is driven by an average effective voltage 1.5 V while the dot-display area C is in its non-display state, since the voltage applied on the guard electrode section B is 3.1 V which is the same voltage as applied to the dot-display area C, the movement of the ionic substances can be effectively stopped by the guard electrode section B, thereby preventing the ionic substances from invading into the dot-display area C.

In conclusion, the liquid crystal panel 1 comprises a plurality of liquid crystal display areas (picto-display area A and the dot-display area C) which are controlled and driven by different driving manners (different driving voltages), an electrode section B is disposed between the plurality of liquid crystal display areas, a driving voltage for driving the electrode section B is equal to at least one of the different driving voltages for driving the plurality of different liquid crystal display areas. Therefore, it is sure to prevent an undesired mutual interference between the plurality of liquid crystal display areas, thereby preventing the dot-display area C from becoming darkened and preventing the picto-display area A from becoming nicked, thereby improving the display quality of the liquid crystal panel.

Although it has been described in the present embodiment that the voltage applied in the guard electrode section B is set to be equal to the voltage applied to the dot-display area C, it is also possible that the voltage applied in the guard electrode section B is set to be equal to the voltage applied to the picto-display area A, depending upon whether the ionicity of liquid crystal used in the liquid crystal panel is high or not. Furthermore, although it has been described in the above embodiment that a voltage Vdd (3.1 V) is applied between the upper and lower ITO layers of the dot-display area C to keep it at a non-display state, it is also possible to have the dot-display area C connected to GND to keep it at a non-display state.

As may be understood from the above description, with the use of the present invention, since electrode section B is disposed between the plurality of liquid crystal display areas, and since a driving voltage for driving the electrode section B is equal to at least one of the different driving voltages for driving the plurality of different liquid crystal display areas, it is sure to prevent an undesired movement of ionic substances from one display area to another, thus preventing mutual interference between the plurality of liquid crystal display areas, thereby preventing any of the display areas from becoming darkened or nicked, thus improving the display quality of the liquid crystal panel.

While the presently preferred embodiments of the this invention have been shown and described above, it is to be understood that these disclosures are for the purpose of illustration and That various changes and modifications may be made without departing from the scope of the invention as set forth in the appended claims.

What is claimed is:

1. A liquid crystal panel comprising:
    a pair of light transmissible substrate plates;
    a plurality of liquid crystal display areas controlled and driven by different driving manners; and
    an electrode section disposed between the plurality of liquid crystal display areas,
    wherein a driving voltage for driving the electrode section is equal to at least one of the different driving voltages for driving the plurality of different liquid crystal display areas.

2. A liquid crystal panel according to claim 1, wherein said different driving manners are different driving voltages.

3. A liquid crystal panel according to claim 1, wherein the plurality of liquid crystal display areas include at least one static-display area and at least one dot-display area.

4. A liquid crystal panel according to claim 2, 3 or 1 wherein the plurality of liquid crystal display areas include at least one constantly displayed area, and at least one area adapted to independently changing over between a displayed state and a non displayed state.

5. A liquid crystal panel according to claim 4, wherein the non-displayed state is a state control led by a power-saving mode.

6. A liquid crystal panel according to claim 1, wherein the driving voltage for driving the electrode section is selected in view of the property of a liquid crystal used in the liquid crystal panel.

7. A liquid crystal panel according to claim 4, wherein a driving voltage for driving the electrode section is equal to a driving voltage for driving the at least one display area adapted to change over between a displayed state and a non-displayed state, when the display area is in the non-display state.

8. A liquid crystal panel according to claim 5, wherein when the at least one display area adapted to change over between a displayed state and a non-displayed state is in the non-displayed state, a driving voltage for driving the electrode section is equal to a driving voltage for driving the at least one display area.

* * * * *